United States Patent
Griswold

[15] 3,670,768
[45] June 20, 1972

[54] FLUID FLOW CONTROL DEVICE

[72] Inventor: Augustus W. Griswold, Rochester, N.Y.

[73] Assignee: Dynak, Inc., Rochester, N.Y.

[22] Filed: June 8, 1970

[21] Appl. No.: 44,242

[52] U.S. Cl. ............................137/606, 251/141, 251/368, 222/132, 222/145, 222/144.5
[51] Int. Cl. ............................................F16k 19/00
[58] Field of Search ..................137/111, 112, 606, 607; 222/132, 144.5, 145, 129.1, 129.2, 129.3, 129.4; 239/412; 251/129, 139, 141, 368

[56] References Cited

UNITED STATES PATENTS

| | | | |
|---|---|---|---|
| 2,698,029 | 12/1954 | Branson | 137/606 X |
| 3,289,948 | 12/1966 | Fuerst | 222/145 X |
| 3,349,968 | 10/1967 | Yuza | 222/132 |
| 3,009,653 | 11/1961 | Hedeman | 222/144.5 X |
| 3,523,676 | 8/1970 | Barker | 251/141 |
| 3,420,260 | 1/1969 | Wisniewski | 251/139 X |
| 3,021,868 | 2/1962 | Kovach | 137/607 |
| 3,366,288 | 1/1968 | Goldschein | 251/141 X |
| 2,804,879 | 9/1957 | Hanson | 137/112 |
| 3,034,761 | 5/1962 | Janquart | 251/129 X |

FOREIGN PATENTS OR APPLICATIONS

| | | | |
|---|---|---|---|
| 917,174 | 1/1963 | Great Britain | 251/141 |

Primary Examiner—Robert G. Nilson
Attorney—Schovee & Boston

[57] ABSTRACT

A fluid flow control device including a body having a plurality of inlet passageways and a single common outlet passageway, and a plurality of solenoid valves connected to the body for controlling fluid flow from the inlet passageways to the outlet passageway. The device and the solenoid valves are resistant to corrosive liquids. The amount of residual-liquid left in any inlet passageway downstream from each solenoid valve when that valve is closed is minimized, to provide as sharp a liquid interface as is possible between each liquid leaving the outlet passageway and the next successive liquid.

16 Claims, 2 Drawing Figures

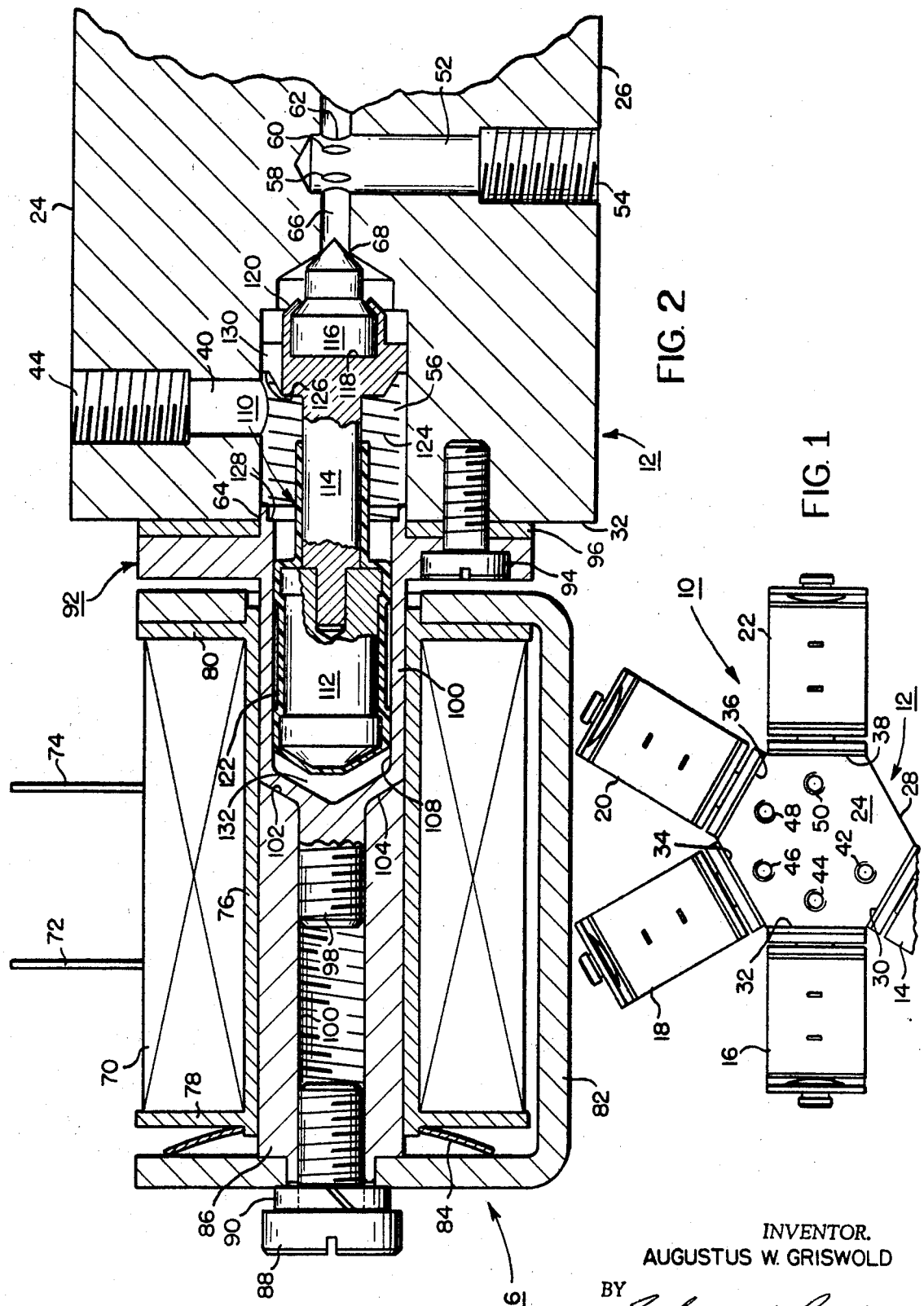

FLUID FLOW CONTROL DEVICE

BACKGROUND OF THE INVENTION

1. Field of the Invention

This invention relates to fluid flow control devices and in a preferred embodiment to a five-way solenoid valve device for use with corrosive liquids and having minimal residual-liquid holding capacity.

Description of the Prior Art

Prior art attempts to control the flow of a plurality of corrosive liquids, while minimizing the residual-liquid holding capacity of the device have included various expensive, complicated, large devices, many of which have not been sufficiently resistant to the corrosive effects of the liquids and many of which have had too high a residual-liquid holding capacity.

SUMMARY OF THE INVENTION

A fluid flow control device for sequentially discharging a series of different corrosive liquids out a common discharge port, while controlling to a high degree of precision the amount of each liquid discharged, and also while insuring a sharp liquid-liquid interface between successive quantities of liquids. When liquid A is shut off and liquid B is turned on, this device insures that as little as possible of liquid A will be mixed with liquid B.

The preferred device comprises a body hexagonal in shape with five inlet ports in the top surface spaced around the periphery thereof, a single, centrally located outlet port in the bottom surface, and five solenoid valves connected to five of the side surfaces and extending radially outwardly therefrom. Each of the solenoid valves includes a small needle valve that is spring biased to close a small passageway leading from a respective inlet passageway to the outlet passageway. When the solenoid is energized the needle valve is pulled off of its valve seat to open the small passageway to allow fluid flow therethrough. The small passageway is very short and has a short length to minimize the residual-liquid holding capacity of the device. The armature of the solenoid is exposed to the corrosive liquid and is made of magnetic material completely coated with a layer of corrosion resistant material.

BRIEF DESCRIPTION OF THE DRAWING

The present invention will be more fully understood by reference to the following detailed description thereof, when read in conjunction with the attached drawing, wherein like reference numerals refer to like elements and wherein:

FIG. 1 is a top plan view of the device of the present invention; and

FIG. 2 is an enlarged partial cross-sectional view of the device of FIG. 1 taken along line 2-2 of FIG. 1.

DETAILED DESCRIPTION OF THE PREFERRED EMBODIMENT

With detailed reference now to the drawing, FIGS. 1 and 2 show a five-way, solenoid valve, fluid flow control device 10 of the present invention. The device 10 comprises a body 12 and five solenoid valves 14, 16, 18, 20, and 22 connected thereto around the periphery of the body 12.

The body 12 is hexagonal in shape and has a flat top surface 24, a flat bottom surface 26 parallel to the top surface 24, and six identical flat side surfaces 28, 30, 32, 34, 36, and 38. The body 12 is provided with five inlet passageways (only one of which, passageway 40, is shown, see FIG. 2), each of which inlet passageways includes an inlet port 42, 44, 46, 48, and 50 in the top surface 24 of body 12. The body 12 is also provided with a single, common, outlet passageway 52 (see FIG. 2) having a discharge or outlet port 54, in the bottom surface 26 of the body 12. All of the inlet and outlet passageways 40 and 52 respectively, extend only partway into the body 12, are parallel to each other, and extend axially of the body 12 (i.e., are parallel to the side surfaces 28–38). The inlet ports 42–50 are equally spaced apart adjacent the periphery of the body 12 (except that no inlet port is associated with side surface 28), and are centrally located with respect to the respective side surface with which they are associated. The outlet port 54 is centrally located in the bottom surface 26. The body 12 is also provided with five valve chambers (only one of which is shown, i.e., chamber 56 providing fluid communication between the inlet passageway 40 and the discharge passageway 52). Each of the five valve chambers provides fluid communication between a respective one of the five inlet passageways and the outlet passageway 52. As shown in FIG. 2, three openings 58, 60, and 62 can be seen in the wall of the outlet passageway 52; the openings 58, 60, and 62 are the openings into the valve chambers (not shown) in fluid communication with inlet ports 46, 48, and 50 respectively. Each of the valve chambers can be considered as a portion of the respective inlet passageway. The valve chambers (e.g., 56) extend radially inwardly from an opening (e.g., circular opening 64 in the side surface 32) to the outlet passageway 52. Each chamber (e.g., 56) includes a small passage-way 66, leading directly into the outlet passageway 52 and having a valve seat 68. The small passageway 66 is of small diameter (i.e., about 0.03 inch) and of short length (i.e., about 0.06 inch) for minimizing the amount of residual-liquid that will be downstream of the valve seat 68 and upstream of the outlet passageway 52.

All of the solenoid valves 14–22 are identical in construction, and therefore only a description of the solenoid valve 16 shown in FIG. 2 will be necessary for a full and complete description of the preferred embodiment of the present invention.

With reference to FIG. 2, the solenoid valve 16 comprises a coil 70 having electrical lead lines 72 and 74 connected thereto for energizing the solenoid 16 as will be understood by one skilled in the art. The coil 70 is supported on a hollow tubular support 76 having end flanges 78 and 80. The coil 70 is positioned inside of a casing 82 and is held relatively rigid therein by means of a spring 84 and is properly oriented in the casing 82 by means of a core 86 connected to the casing 82 by means of a screw 88 and lockwasher 90. The solenoid valve 16 is attached to the body 12 through the intermediary of a sleeve 92 mounted on the body 12 by means of two screws 94 (only one of which is shown in FIG. 2). A gasket 96 is interposed between the sleeve 92 and the side surface 32 of body 12. The sleeve 92 includes an externally screw threaded tip 98 which threadingly mates with an internally screw threaded bore 100 in the core 86. Thus, after the sleeve 92 is attached to the body 12, the solenoid valve 16 is simply screwed onto the tip 98 until a shoulder 102 of the core 86 abuts a shoulder 104 of the sleeve 92.

The sleeve 92 includes a hollow cylindrical portion 106 defining an armature cavity 108 that is "in-line" with the valve chamber 56. A plunger assembly 110 is positioned partly in the armature cavity 108 and partly in the valve chamber 56. The plunger assembly 110 includes a magnetic armature 112 positioned in the armature cavity 108 and a non-magnetic needle 114 connected to the armature 112 (preferably by brazing). The plunger assembly 110 also includes a needle tip 116, preferably of silicone rubber, positioned in a recess 118 in the needle 114 by means of a crimped edge 120. All of the armature 112 and a portion of the length of the needle 114 are coated with a layer 122 of corrosion resistant material (preferably KEL–F; Teflon can also be used) preferably approximately 0.015 inch thick. A compression spring 124 is positioned in the valve chamber 56 between a shoulder 126 of the needle 114 and a shoulder 128 of the sleeve 92, for biasing the plunger assembly 110 to the right (as viewed in FIG. 2) for causing the needle tip 116 to seat on the valve seat 68, thus closing the passageway 66 to prevent fluid communication between the inlet passageway 40 and the outlet passageway 52. The pressure of the fluid in the chamber 56 also acts to force the plunger assembly 110 to the right (as viewed in FIG. 2) to close the passageway 66. The needle 114 has an outside diameter slightly smaller than the inside diameter of the valve chamber 56 to provide for sliding movement of the plunger assembly 110 in the armature cavity 108 and the chamber 56. The needle 114, however, includes a plurality of passages 130 for providing fluid communication past the needle 114 to the passageway 68. The magnetic armature 112 is preferably made of magnetic steel and the needle 114 of non-magnetic, corrosion resistant, stainless steel. All of the chamber 56 and armature cavity 108 becomes filled with the fluid entering through the inlet passageway 40;the fluid passes between the outside diameter of the layer 122 and into a working gap 132 of the solenoid valve 16.

Upon energization of the solenoid 16, the plunger assembly 110 moves to the left as far as possible in the armature cavity 108, thus opening passageway 66 and providing fluid communication between the inlet passageway 40 and the outlet passageway 52. When the solenoid 16 is de-energized, the compression spring 124 forces the plunger assembly 110 to the right (as viewed in FIG. 2), whereby the needle tip 116 provides a fluid seal against the valve seat 68. This construction provides a minimum amount of residual liquid within the device 10 so that when a second solenoid valve, such as solenoid valve 18, is energized, the smallest possible amount of residual-liquid liquid from chamber 56 will be left in the device to mix with the next subsequent liquid entering through opening 58.

In assembling the five-way solenoid valve device 10 of the present invention, first the plunger assembly 110 is inserted into the chamber 56, then the spring 124 is positioned against the plunger assembly 110. Next the sleeve 92 is screwed onto the body 12, and then the solenoid 16 is screwed onto the tip 98 of the sleeve 92.

The present invention is not limited to the specific preferred construction described above. For example, the present invention is not limited to the use of five solenoids and five inlet openings. Any number of solenoids and inlet openings can be used. The present invention is also not limited to the construction wherein the passage openings 58, 60, and 62, for example, are positioned in the same plane of the body 12. The chamber 56 and passageway 66 may be axially spaced (or staggered) from the other chambers and passageways. The length of the passageway 66 should be made as short as possible.

The invention has been described in detail with particular reference to preferred embodiments thereof, but it will be understood that variations and modifications can be effected within the spirit and scope of the invention as described hereinabove and as defined in the appended claims.

I claim:
1. A fluid flow control device comprising:
   a. a body having a plurality of separate inlet passageways therein, a common outlet passageway therein, and a plurality of valve chambers therein, one each of said valve chambers providing fluid communication between a respective one of said inlet passageways and said outlet passageway;
   b. a plurality of solenoid valves connected to said body, one each of said solenoid valves being associated with a respective one of said valve chambers, and each of said solenoid valves including means positioned in its associated valve chamber for opening and closing fluid communication between said associated valve chamber and said outlet passageway;
   c. said portion of each of said valve chambers between said outlet passageway and said opening and closing means having a length of about 0.06 inch, whereby the amount of residual liquid in said portion after fluid communication through said portion is closed, is minimized; and
   d. wherein said body has flat, parallel, top and bottom surfaces, and a plurality of identical side surfaces, wherein each of said inlet passageways includes an inlet port in said top surface, said inlet ports being equally spaced around said top surface adjacent the periphery thereof, each of said ports being approximately centrally located with respect to one of said side surfaces, and wherein said outlet passageway includes an outlet port centrally positioned in said bottom surface.

2. The apparatus according to claim 1 wherein each of said valve chambers extends radially inwardly from a central opening in a respective one of said side surfaces to said outlet passageway.

3. The apparatus according to claim 2 wherein each of said solenoid valves is sealingly mounted about its respective central opening.

4. The apparatus according to claim 3 wherein each of said solenoid valves is connected to said body by means of a bracket connected to said body, said bracket including a hollow sleeve forming an armature cavity of said solenoid valve and said bracket also including an externally threaded pin extending axially from said sleeve for threadingly mating with an internally threaded core of said solenoid valve, for connecting said solenoid valve to said bracket.

5. A fluid flow control device comprising:
   a. a body having a regular polygonal shape in horizontal cross section and including a flat top surface and a flat bottom surface parallel to the top surface, and a plurality of identical side surfaces;
   b. a plurality of inlet ports in said top surface, each port being centrally located with respect to a side surface and each port being located radially outwardly from the vertical axis of said body;
   c. a single common outlet port centrally located in said bottom surface;
   d. a single common outlet passageway extending axially upwardly from said outlet port partway up the height of said body;
   e. a plurality of valve chambers each extending radially inwardly from a side opening in a respective side surface of said body toward an upper terminal end of said outlet passageway;
   f. a single, minimal residual-liquid holding capacity passageway connecting a respective one of each of said chambers with only said upper terminal end of said outlet passageway;
   g. a plurality of solenoid valves each one connected to a respective one of said side surfaces having a side opening therein, said solenoid valves extending radially outwardly therefrom in sealing contact around said side opening, each of said solenoid valves including valve means positioned at least partly in a respective one of said valve chambers for opening and closing fluid communication through the corresponding one of said minimal residual-liquid holding capacity passageways;
   h. each of said solenoid valve means including a plunger assembly radially movably positioned partly in said valve chamber and partly in an armature cavity in said solenoid valve for movement between a closed position preventing fluid flow to said outlet passageway and an open position allowing fluid flow to said outlet passageway; means biasing said plunger assembly to its closed position; and said solenoid valve including means for moving said plunger assembly to its open position when said solenoid valve is electrically energized;
   i. said plunger assembly including an armature of magnetic material completely coated with a layer of corrosion resistant material;
   j. said plunger assembly including a conical needle tip made of corrosion resistant material and positioned to seal said minimal residual-liquid holding capacity passageway when said plunger assembly is in said closed position; and
   k. said minimal residual-liquid holding capacity passageway having a small diameter and having a length not substantially greater than that necessary for the material of said body between said outlet passageway and said chamber to maintain its structural integrity, whereby the amount of residual liquid in said minimal residual-liquid holding capacity passageway after the corresponding plunger assembly moves to its closed position, is minimized.

6. The apparatus according to claim 5 wherein said small passageway has a length of about 0.06 inch and a diameter of about 0.03 inch.

7. The apparatus according to claim 6 wherein each of said solenoid valves is connected to said body by means of a bracket connected to said body, said bracket including a hollow sleeve forming an armature cavity of said solenoid valve and said bracket also including an externally threaded pin extending axially from said sleeve for threadingly mating with an internally threaded core of said solenoid valve, for connecting said solenoid valve to said bracket.

8. The new use of the structure recited in claim 5 comprising providing as sharp a liquid interface as is possible between a plurality of different liquids fed seriatim to said outlet port, comprising feeding different liquids to said inlet ports, and sequentially feeding said different liquids through said device and out said outlet port.

9. A fluid flow control device comprising:
   a. a body having a single common outlet passageway approximately centrally located therein and extending from a closed end inside said body to an outlet opening on a surface of said body;
   b. said body including a plurality of at least three separate inlet passageways therein, said inlet passageways each having a separate inlet opening on a surface of said body and a separate outlet opening in a wall of said outlet passageway, each of said inlet passageway outlet openings being immediately adjacent said closed end of said common outlet passageway;
   c. said body including a plurality of valve chambers therein, one each of said valve chambers being in one each of said inlet passageways;
   d. a plurality of solenoid valves connected to said body, one each of said solenoid valves being associated with a respective one of said valve chambers, and each of said solenoid valves including means positioned in its associated valve chamber for opening and closing fluid communication between said associated valve chamber and said outlet passageway; and
   e. the portion of each of said inlet passageways between its respective opening and closing means and its opening into said outlet passageway having a length of approximately 0.06 inch, whereby the amount of residual liquid in said portion is minimized to provide a sharp liquid interface between successive, different charges of liquid from said inlet passageways to said outlet opening.

10. The apparatus according to claim 9 wherein each of said solenoid valves includes: an armature cavity positioned in-line with its associated valve chamber, and a plunger assembly slidably mounted partly in said armature cavity and partly in said valve chamber, for movement between an open position allowing fluid flow to said outlet passageway and a closed position preventing fluid flow to said outlet passageway, means for biasing said plunger assembly to its closed position, and said solenoid valve including means for moving said plunger assembly to its open position when said solenoid valve is electrically energized.

11. The apparatus according to claim 10 wherein said plunger assembly includes an armature of magnetic material completely coated with a layer of corrosion resistant material.

12. The apparatus according to claim 11 wherein said plunger assembly includes a needle positioned primarily in said valve chamber, said needle being connected to said armature and including a needle tip positioned to seal said portion of said inlet passageway when said plunger assembly is in said closed position.

13. The apparatus according to claim 12 wherein said needle is made of corrosion resistant non-magnetic material.

14. The apparatus according to claim 13 wherein both said armature and needle are made of stainless steel, wherein said needle is brazed to said armature, and wherein said layer also extends over at least part of the length of said needle.

15. The apparatus according to claim 12 wherein said portion of said inlet passageway includes a valve seat facing said valve chamber, and wherein said needle tip is made of a silicon rubber shaped to sealingly fit in said valve seat.

16. The apparatus according to claim 12 wherein said small passageway has a diameter of about 0.03 inch.

* * * * *